United States Patent [19]
Kertz

[11] Patent Number: 5,464,456
[45] Date of Patent: Nov. 7, 1995

[54] ELECTRONIC STIMULATION OF PLANTS

[76] Inventor: M. Glen Kertz, 3484 Pheasant, Orange, Tex. 77630

[21] Appl. No.: 86,446

[22] Filed: Jun. 30, 1993

[51] Int. Cl.$^6$ .............................. A01G 5/06; A01G 7/04; A01G 7/06; A01G 31/00
[52] U.S. Cl. ................ 47/1.3; 47/40.5; 47/41.01; 47/41.11; 47/59; 47/60; 47/62
[58] Field of Search ................. 47/1.3, 1.301, 47/DIG. 8, 41.01, 41.1, 41.11–41.15, 59, 60, 62, 40.5

[56] References Cited

U.S. PATENT DOCUMENTS

| | | | |
|---|---|---|---|
| 784,346 | 3/1905 | Pilsoudsky et al. | 47/1.3 |
| 882,699 | 3/1908 | Latshaw | 47/1.3 |
| 1,331,261 | 2/1920 | Hornsby | 47/74 |
| 1,874,207 | 8/1932 | Purplaw | 47/1.3 |
| 3,842,539 | 10/1974 | Sacalis | 47/58 |
| 3,944,916 | 3/1976 | Tillander | 324/65 P |
| 4,103,457 | 8/1978 | Carlisle | 47/58 |
| 4,291,125 | 9/1981 | Greatbach | 47/1.3 |
| 4,785,575 | 11/1988 | Shioi | 47/1.3 |

*Primary Examiner*—David T. Fox
*Attorney, Agent, or Firm*—Conley, Rose & Tayon

[57] ABSTRACT

The invention relates to the electronic stimulation of plant development. More particularly, it relates to the stimulation of plant development through electrifying the environment around a plant or part of a plant with an electrical field, preferably a pulsed field. The present invention also relates to an electronic method of stimulating the active membrane transport systems of growing plants and harvested plant products in order to promote growth and extend the shelf life of harvested material. The invention is of particular interest as it relates to shipment and marketing of cut flowers, greens and trees and more particularly to methods and apparatus for handling, shipping, and marketing of cut flowers.

23 Claims, 6 Drawing Sheets

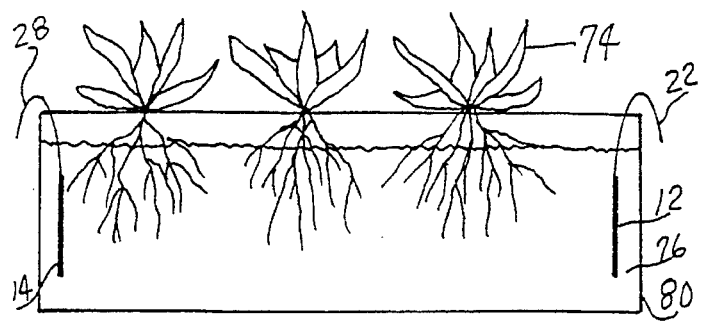
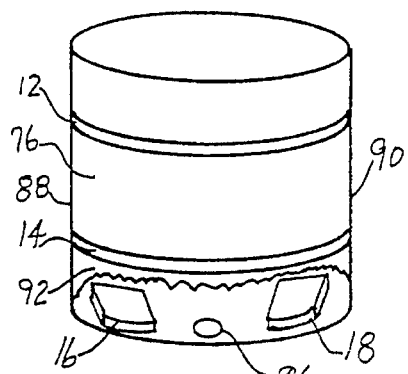
FIG 4
FIG 6
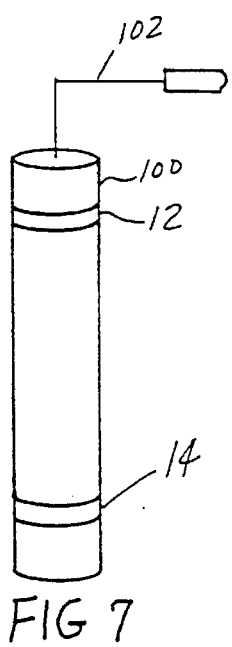
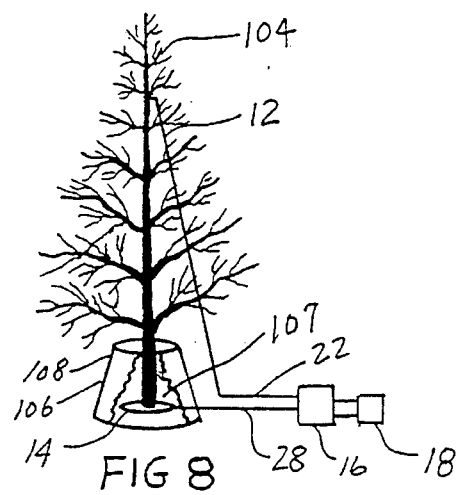
FIG 7
FIG 8

ELECTRONIC STIMULATION OF PLANTS

BACKGROUND OF THE INVENTION

A. Field of the Invention

The invention relates to the electronic stimulation of plant development. More particularly, it relates to the stimulation of plant development through electrifying the environment in and around a plant or part of a plant using an electrical field, preferably a pulsed field. The present invention also relates to an electronic method of stimulating the active membrane transport systems of growing plants and harvested plant products in order to promote growth and extend the shelf life. The invention is of particular interest as it relates to shipment and marketing of cut flowers, greens and trees and more particularly to methods, products of methods and devices for handling, shipping, marketing and enjoyment of cut flowers.

B. Description of the Related Art

For the past forty years there has been a steady growth of the consumer horticultural industry in the United States and its growth continues to out pace all other major farm sectors. Overall, the industry had an estimated 44 billion dollars in 1992 sales. Potted foliage plants, cut flowers, potted flowering plants, bedding plants and cut live trees represented an estimated 6.7 billion of this figure up from 4.4 billion in 1989 at a growth rate averaging 3–5 percent per year. In this highly competitive marketplace, premiums are placed on freshness of the product.

This industry consists of thousands of growers and retailers and in recent years, foreign imports have dramatically increased the competition in the industry. Growers and retailers are faced with ever increasing demands to produce and market quality products at reasonable prices.

The highly competitive market place has forced both grower and retailer to incorporate technological advances into their business in order to maintain competitiveness. Most of the technological developments in the industry have been production oriented and have offered few advances for the retailer. These technological advances for the most part have been limited to the commercial portion of the industry and have not been available to the consumer public.

Electrical Potential in Plant Cell Membranes

A relationship exists between electrical potential and membrane activity in plants. This electrical potential is commonly referred to as the action ("resting") potential of all cells. Action potential plays a critical role in the uptake and movement of nutrients in the plant. Resting electrical potentials between the intercellular and extracellular material of plant cells are known. Blinks, L. R., "Some Electrical Properties of Large Plant Cells," in Electrochemistry in Biology and Medicine, Shedlovsky, ed., John Wiley & Sons, New York, 1955, pp. 187–212. The resting potential can range from approximately 10–200 millivolts and may be partly responsible for active transport in plants. Active transport allows the movement of materials such as potassium and calcium across cell membranes against a concentration gradient.

The intercellular charge is almost always negative when measured against extracellular material. The difference in potential and the potential's ability to facilitate movement across a membrane is referred to as electroendosmosis. Blinks, L. R. 1940, "The Relation of the Bioelectric Phenomena to Ionic Permeability and to Metabolism in Large Plants, "Cold Spring Harbor Symp. Quant. Biol. 8:204–215, 1940.

Damage to the membrane structure of a plant cell (such as during harvesting of the plant) allows for the leakage of certain salts such as potassium causing the membrane to return to a neutral resting potential. For instance, potassium leakage was observed when Halicystis cells were placed under anaerobic conditions. The cells were incapable of producing sufficient aerobic metabolic energy to maintain their resting potential. Blinks, L. R., "The Source of the Bioelectric Potential in Large Plant Cells," Proc. Natl. Acad. Sci. U.S.A. 35:566–575, 1949.

Plants are also known to take up certain salts such as potassium, calcium, magnesium and nitrate through the root hairs of the plant. These salts all play a role in the growth process of the plant. From the root hair cells, the salts are moved to the xylem ducts against a concentration gradient, possibly utilizing the active transport system, and are then distributed throughout the plant. High osmotic pressures develop as a result of this transport and are partly responsible for maintaining turgor pressure throughout the plant. When this transport system is interrupted the plant wilts and ultimately dies from lack of nutrient and fluid uptake. Biddulph, O., "Translocation of Inorganic Solutes," in Plant Physiology. A treatise., Stewart, ed., Academic Press, New York, Vol. 2 pp. 553–603, 1959.

In excitable plant cells such as those of Mimosa, direct electrical or mechanical stimulation produces a dramatic change in the action potential of the membrane and produces an electrical wave that ultimately effects turgor pressure. Sibaoka, T., "Excitable Cells in Mimosa," Science 137:226, 1962. Similar changes in action potential have also been demonstrated in Nitella cells. Osterhout, W. J. V., "Electrical Potential in Large Plant Cells," Physiol. Rev. 16:216–237, 1936. Cells of Nitella show that a refractory or rest period is required before the action response can be triggered by stimuli. The membrane must have a rest period before an ionic flux in the membrane can be further stimulated. This refractory period can last from seconds to hours depending on the stimuli or damage inflicted on the cell. Blinks, L. R., "Some Electrical Properties of Large Plant Cells," in Electrochemistry in Biology and Medicine, Shedlovsky, ed., John Wiley & Sons, New York, pp. 187–212, 1955. Action potentials in excitable plant cells have also been shown to be more than mere current flow in a conductive medium. The speed of the electrical wave is much slower than a typical electrical current as the membranes must have time to adjust to the stimuli. Osterhout and Hill, 1929–30 J. Gen. Physiol. 13:548.

While the exact nature of the active membrane transport system of plants is not fully understood, electrical potential of membranes plays a role. Further, affecting changes in the ionic potential of a membrane will alter its function and affect its ability to take up salts and fluids.

Enhancing Plant Growth with Electrical Current

Electricity has been used for the enhanced growth of plants by application of constant current. In some cases, very high levels of current have been used as a direct heating method for the soil and to promote growth (U.S. Pat. No. 1,874,207). U.S. Pat. No. 784,346 relates to a method of cultivating plants by electricity. The claimed invention was for a process of electroculture which consisted of subjecting adjacent parallel sections of soil in a field to the action of galvanic currents. The current is achieved in opposite directions between buried plates of dissimilar metals connected by overhead conductors.

Electrical currents have also been applied to receptacles (pots) containing plants. U.S. Pat. No. 882,699 relates to means for subjecting the roots of a plant in a receptacle to a constant electrical and magnetic action. U.S. Pat. No. 1,331,261 relates to a pot for growing flowers which incorporates in the mass of the pot forming material, a substance such as ground carbon, metallic zinc or lead. In the pot mass, there are also incorporated certain salts such as chloride salts. The invention proposes that when the pot so constituted is subjected to moisture in the natural use thereof, a chemical reaction will be set up between the carbon and zinc or lead, through the action of the salts, causing electrochemical effects which will stimulate plant growth.

The Effects of Magnetism on Plants

It is also known that magnetism has a profound effect on the growth of plants. U.S. Pat. No. 4,785,575 relates to a apparatus for raising garden plants utilizing magnetism, particularly an apparatus utilizing magnetism to promote the uptake of fertilizer in the plant. Apparently, when plants are subjected to magnetism, the germination of seeds is affected, the growth of the plants is hastened, leaf color is darkened, and the plants resist damage by disease and pests. See, e.g., Japanese Patent Publication No. 52-5716 (disclosing a magnet for plant growth in which a powdered strongly magnetic material, an aqueous caking substance and a deliquescent substance are mixed, compression molded and then magnetized) and Japanese Patent Publication No. 40-11328 (disclosing a method of increasing the growth of a plant by utilizing magnetic energy).

Marketing Harvested Plants

The physiology of the flower once it is removed from the parent plant is referred to as post harvest physiology. Flowering plants are complex living organisms made up of roots, stems, leaves, flowers and a host of intricate subsystems supporting these organs. The chief subsystem connecting all these plant parts is the complex vascular system of each plant. This vascular system allows for the transfer of a variety of fluids throughout the plant. Sap is the fluid constituent of the vascular system and it consists of primarily water. There are also nutrients and other chemicals in the sap necessary to the plant's existence.

The root system of a plant serves two major functions. First, it serves as the support system, anchoring the plant to the subsurface. The second function is the uptake of water and nutrients. This uptake is chiefly accomplished through the process of osmosis. This process is selective and is responsible for the plant's ability to concentrate selected molecules.

Once water and nutrients have been absorbed by the plants roots, these substances are translocated to the stems of the plant. This translocation occurs due to a variety of processes. They include osmosis and capillary action. The vascular system of the plant is designed to facilitate the movement of fluids due to capillary action.

Leaves (and the structures derived from leaf tissue such as sepals, petals and flower parts) are the primary location of two means of fluid loss in plants. This loss occurs chiefly due to transpiration and evaporation. Typically, on the underside of a leaf specialized cells organized into specific organs called stomata are found. These organs function as gates that allow the control of fluids in the plant. During hot dry periods, these gates are closed restricting the loss of fluid and restricting the flow of fluids through the plant. When water is plentiful and the temperature is not excessively hot, these organs open to allow evaporation of water. This evaporative process is believed to complete the translocation of water through a plant.

Plants maintain their erect position under natural conditions by turgor pressure. This pressure is that of the individual plant cells (intercellular) and in the compartments of the plant vascular system (vascular). When the primary fluid flow of the plant is interrupted, loss of turgor pressure ensues. This is normally seen as wilting of the plant. If the fluid flow is not reestablished in a given period of time, the plant enters terminal wilt. Once this time limit is reached, the plant looses its ability to take up water or other fluids and it dies.

When a flower is cut from the parent plant, it is separated from this complex fluid delivery system. Immediately, it begins to loose fluids. The losses occur in two forms, evaporation through the leaves and loss through the wound site created by severing the parent plant and flower stem. Many plants have a wound response which attempts to seal the wound both in the severed flower stem and in the parent plant. This is most easily seen in the latex bearing plants which upon wounding, exude a sticky latex sealant to cover the wound site.

Thus, there are a large number of post-harvest factors that may affect the useful life of a cut flower including: initial growing conditions of the flowering plant; method of harvesting and immediate post-harvest treatment; duration and method of shipping; quality of water used for storage; bacterial load of the parent plant and flower; temperature and humidity of the air; quantity and quality of available light; and presence or absence of ethylene gas.

Prior Art Approaches for Maintaining Cut Flower Freshness

In flower harvesting, sometimes the grower will artificially seal the wound site to help prevent water loss. Additionally, harvested flowers are routinely stored in cool damp conditions to further reduce water loss through evaporation. Storage in water during shipping is usually impractical and raises the risk of microbial damage to the harvested product.

Consumers are usually instructed to recut the flower stems in order to reestablish a fresh wound thus causing fluid flow to be reinitiated. This approach does extend the useful life of the flower but provides only a limited uptake of fluids. Loss or withering of petals, weakening of the stem, and rotting or spoilage of the leaves, and premature senescence are among the symptoms which may make a cut flower lose its freshness or viability.

Currently to minimize the deterioration of flowers in transit from the field to the customer, they are maintained in water where possible. It is known that maintaining the stems of cut flowers in water can prolong their freshness by allowing the flower to absorb water and replace the moisture lost through transpiration. It is also known that as the relative humidity of the environment in which the flowers are maintained decreases, transpiration increases, causing the flowers to wither sooner. Finally, it is known that refrigeration extends the flowers' span of viability by slowing the organic processes associated with the flowers' respiration. It is generally preferred to refrigerate cut flowers at temperatures of approximately 34°–38° F.

Procedures exist for the maintenance of flowers in refrigerated, humidity-controlled environments, which may eliminate the need for keeping the stems in water, thereby minimizing water-borne diseases. Preferably the relative humidity in such environments is 90–92%. Higher levels of humidity can promote decay, while lower levels allow the flower to dry out. Humidity-controlled environments are costly to provide, and as access to the flowers takes place, some exchange with the ambient atmosphere may occur, increasing the volume of air which must be climate-controlled.

Flower handling, storage, and shipment methods discussed above have been used with respect to flowers for sale with varying degrees of success. Due to the high cost of flower stock and the cost and inconvenience of the various methods of minimizing flower deterioration, it is desired to improve the state of the art. In particular, methods and apparatus are needed which (1) promote the development of plants or maintain the freshness of plant parts without the need for refrigeration or (2) improve the freshness of plant parts utilizing refrigeration over that of prior art approaches requiring refrigeration. Preferably, such methods and apparatus should be applicable to various stages of post-harvest handling and should be readily utilizable by consumers as well. The present invention overcomes certain of the deficiencies of the prior art methods and apparatus.

SUMMARY OF THE INVENTION

The preferred invention overcomes the limitations of the prior art by providing methods and apparatus which promote the development or maintain the freshness of plants or plant parts. By using an apparatus that is simple and safe to operate, the development and maintenance of plants and plant parts is readily accomplished by consumer and producer alike.

The plant stimulator of the present invention includes a positive and a negative electrode electrically connected to a pulse generator supplied with electricity by a power source. The pulse generator includes a timer having an associated variable resistor, non-variable resistor, and capacitor to provide a pulsed circuit to the positive and negative electrodes.

The plant stimulator may be utilized in accordance with various preferred methods of the present invention. The electrodes may be immersed in a medium with a plant or plant part therebetween. Alternatively, the negative electrode may be placed adjacent the bottom of the container for the plant or plant part with the positive electrode disposed near the surface of the plant development medium. In another method, the negative electrode may be placed in a medium for a plant part with the positive electrode being affixed to the stem at another location of the plant part.

Thus, the present invention relates generally to methods and apparatus for electronically stimulating and enhancing the active membrane transport system in plant material by the application of constant or discrete pulses of electrical energy. By so doing, the method results in promoting growth and maintaining cellular activity in harvested material. This method may be applied to any plant or plant part including plants growing in soil or other medium (such as hydroponic solution), cut flowers, harvested fruits and vegetables and field grown crops.

BRIEF DESCRIPTION OF THE DRAWINGS

For a detailed description of the preferred embodiments of the present invention, reference will now be made to the accompanying drawings wherein:

FIG. 4 is a side elevational view of a plurality of plants disposed in media between two electrodes in accordance with the methods of the present invention;

FIG. 6 is a perspective view of a pot incorporating the electrodes, power supply, and pulse generator of the present invention;

FIG. 7 is a side elevational view of a probe or wand having a lower negative electrode and an upper positive electrode separated by non-conductive, insulative material;

FIG. 8 is a side elevational view of a Christmas tree with a negative electrode positioned in the tree stand and a positive electrode positioned adjacent the top of the tree for practicing the method in accordance with the present invention;

DESCRIPTION OF THE PREFERRED EMBODIMENTS

Apparatus

In certain embodiments, the apparatus comprises a pulse generator further comprised of a printed circuit board that is controlled by an integrated circuit that serves as a negative wave generator and as the timing apparatus for the cyclic production of the pulse. Power for the pulse generator can be supplied by battery, line current, solar power or any other method of generating an electrical charge of sufficient quantity to power the pulse generator. Electrodes are attached to the pulse generator by insulated wire.

Figure 1:
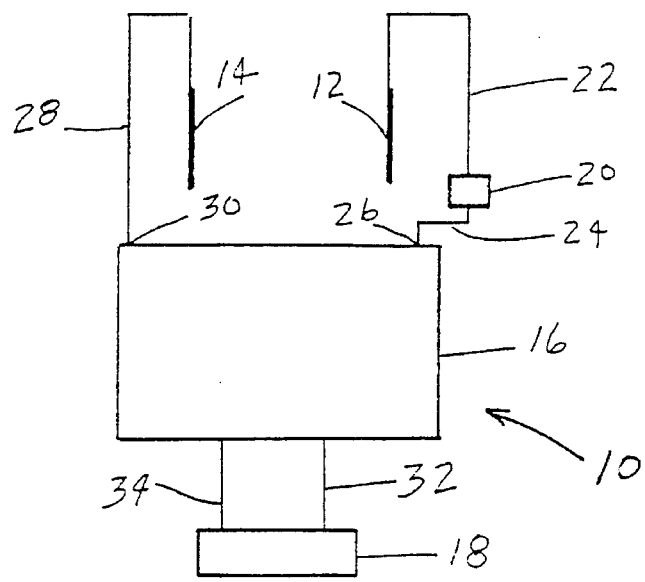
FIG. 1 is a schematic representation of the apparatus of the plant stimulator of the present invention.

Referring initially to FIG. 1, there is shown a preferred embodiment of an apparatus for practicing the methods of the present invention. The apparatus of FIG. 1 is a plant stimulator 10 including a positive electrode 12 and a negative electrode 14 electrically connected to a pulse generator 16 powered by a power source 18. An LED 20 may be connected between positive electrode 12 and pulse generator 16. Positive electrode 12 is electrically connected to LED 20 by an electrical conduit 22. An electrical conduit 24 electrically connects light emitting diode (LED) 20 to the positive terminal 26 of pulse generator 16. Negative electrode 14 is electrically connected by electrical conduit 28 to negative terminal 30 on pulse generator 16. Power supply 18 is electrically connected to pulse generator 16 by positive electrical conduit 32 and ground 34.

The positive electrode 12 is preferably made of tungsten and the negative electrode 14 is preferably made of copper. However, it can be appreciated by those skilled in the art that other metals or conductive materials may be used as electrodes depending upon the method of application. Additionally, the size and shape of the electrodes will vary depending upon the application.

The pulse generator 16 provides a controlled self-repeating generation of a timed negative pulse wave and is a self-resetting negative pulse generator. The trigger timing and reset values of pulse generator 16 are controlled by the value of the capacitors and resistors used in the circuitry, hereinafter described in further detail. The pulse generator 16 preferably has low energy consumption for general operation and can be triggered by as little as –0.3 volts with a maximum voltage input of 18 volts.

Figure 2:
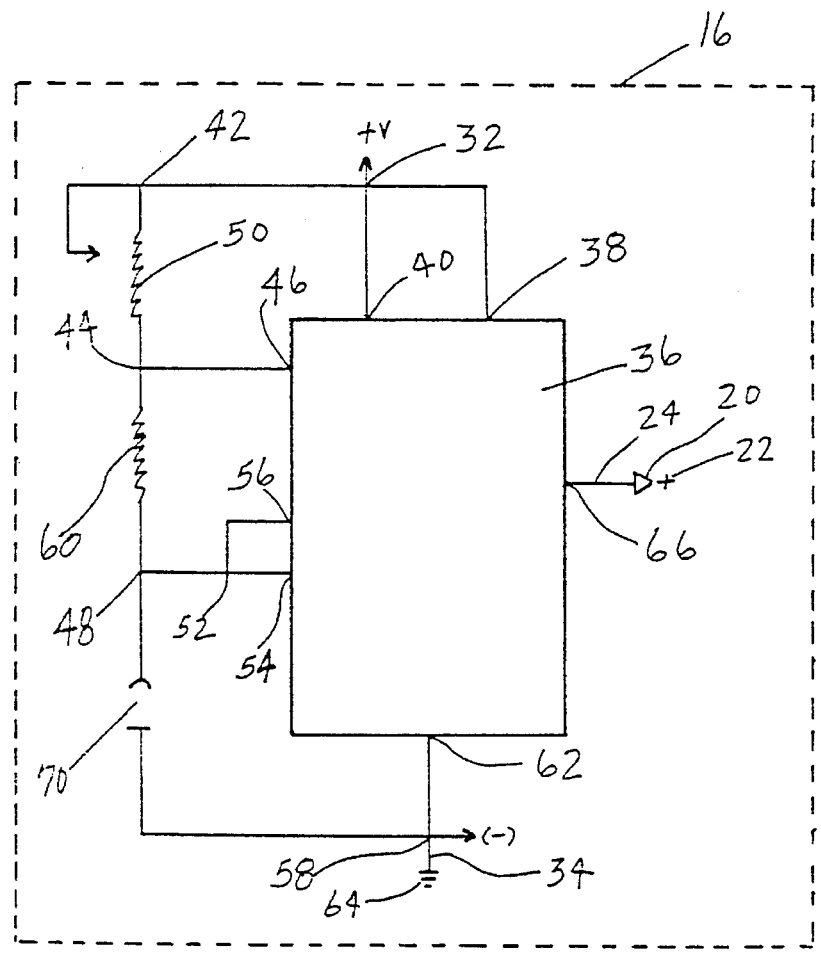
FIG. 2 is a circuit diagram of the electrical circuit of the apparatus of FIG. 1.

Referring now to FIG. 2, the electrical circuit of the pulse generator 16 is shown. Pulse generator 16 includes an Archer TLC555 Timer 36 wired to a printed circuit board in an astable mode. Timer 36 may be an IC (integrated circuit) model/#TLC555 manufactured by Radio Shack™, a division of Tandy Corporation, from Fort Worth, Tex. The TLC555 is a monolithic timing circuit using the LIN-CMOS™ process. Timer 36 is a standard 8 pin integrated circuit package and is connected to support electronics hereinafter described. Pulse generator 16 produces an oscillating output which is thereby connected to positive electrode 12 (FIG. 1) to conduct a pulsating current through a plant development medium or plant part.

Timer 36 includes a reset terminal 38 and a supply terminal 40 which are both electrically connected to the positive conduit 32 of power source 18 (FIG. 1). The circuit of pulse generator 16 includes a variable resistor 50, a non-variable resistor 60, and a capacitor 70. The variable resistor 50 includes a first terminal 42 electrically connected to the positive conduit 32 of power supply 18 and another terminal 44 electrically connected to a discharge terminal 46 of timer 36. Non-variable resistor 60 is also electrically connected to discharge terminal 46 via terminal 44. The other terminal 48 is electrically connected to terminal 52. Terminal 52 is electrically connected to trigger terminal 54 and threshold terminal 56 of timer 36. Threshold terminal 56 is electrically connected to trigger terminal 54.

The anode of the timing capacitor 70 is electrically connected to the terminals 48 and 52 and thus trigger terminal 54 of timer 36. The cathode of capacitor 70 is electrically connected to the negative electrical conduit 34 of power source 18 via terminal 58. The ground terminal 62 of timer 36 is also connected to negative electrical conduit 34 via terminal 58 and thus to ground 64. Output terminal 66 of timer 36 is electrically connected to the anode of LED 20. LED 20 is connected between output terminal 66 and positive electrode 12 to serve as a visible signal that pulse generator 16 is working properly and pulsating current is being produced. A control terminal (not shown) of timer 36 is not electrically connected.

Variable resistor 50 and non-variable resistor 60 together with timing capacitor 70 are connected in parallel so as to act as a timing circuit. Starting from an initial uncharged state, timing capacitor 70 begins to store an electrical potential as current is sourced through resistors 50, 60. The capacitor voltage is monitored at threshold 56 and trigger terminal 54. When the voltage increases above a predetermined trigger level established by the internal circuitry of timer 36, output terminal 62 of timer 36 changes potential to a high voltage level. The internal circuitry of timer 36 thus produces a negative feedback to the discharge terminal 46 and pulls the terminal 46 to a low voltage state. The voltage potential stored on capacitor 70 begins to discharge to a low voltage level through the path established by resistor 60. As capacitor 70 discharges and the capacitor potential falls below the predetermined trigger level, the output terminal 62 of timer 36 changes state to a low voltage level and the discharge terminal 46 will change to a high voltage level. Current will then begin to flow through resistors 50, 60, and capacitor 70 will again begin to store a potential. This process of storing and discharging continues so long as power is supplied to the circuit by power source 18 (FIG. 1).

Output terminal 62 will oscillate between a low voltage and high voltage levels, at a frequency determined by the values of resistors 50, 60 and capacitor 70. Non-variable resistor 60 has a constant value of 1000 ohms. The variable resistor 50 has a variable resistance between 10,000 and 1,000,000 ohms. Timing capacitor 70 has values which range from 0.22 to 0.068 microfarads. Power source 18 (FIG. 1) generates a voltage which may be changed between negative 0.0001 and positive 5 volts. In the preferred embodiment, the variable resistor 50 is 1,000,000 ohms, non-variable resistor 60 is 1,000 ohms, capacitor 70 is 0.068 microfarads, and the voltage supplied by power source 18 (FIG. 1) is 5 volts. The combination of the preferred embodiment produces an output frequency of 20 hertz.

In operation, the plant stimulator 10 is utilized in one of several preferred methods of the present invention. Positive and negative electrodes 12, 14 are adapted for use with varying methods of plant stimulation of the present invention. Electrodes 12, 14 may be placed in an electrically conductive media with a plant disposed therebetween to induce a current through the media to stimulate the uptake of fluids in the plant. In a variation of this method, negative electrode 14 may be placed adjacent the bottom of the container containing the plant or plant part and media with the positive electrode 12 being disposed adjacent the surface of the media so as to conduct electrical current through the media to enhance the uptake of fluids into the plant. In another method of use, the negative electrode may be placed in a container of media with one end of the plant disposed on the media and the positive electrode attached to another part of the plant such that the electric current is conducted through the media and through the plant to induce plant stimulation. In still another application of plant stimulator 10, the electrodes may be placed opposite plant growing areas to conduct electrical current through the soil or other media.

As shown in FIGS. 3–8 a variety of configurations of the apparatus 10 may be seen. In each case, the positive electrode 14 is constructed in a manner to allow a conductive surface of that electrode to easily contact the plant development medium 76 or a distal portion of the plant or plant part vascular system. In each case, the negative electrode 14 is constructed in a manner to allow a conductive surface of that electrode to easily contact the plant development medium 76. In each case, both the positive electrode 12 and the negative electrode 14 are operably connected through lead wires 22 and 28, respectively, to the pulse generator 16 which is in turn operably connected to an electrical power source 18. In each case, the positive electrode 12 and negative electrode 14 are spatially separated. FIGS. 6 and 7 additionally illustrate separation by non-conductive materials between the spaced electrodes 12, 14.

Figure 3:
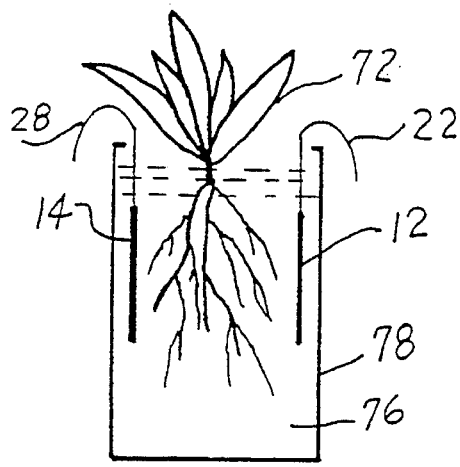
FIG. 3 is a side elevational view of a plant disposed in media between electrodes in accordance with the methods of the present invention.
Figure 5:
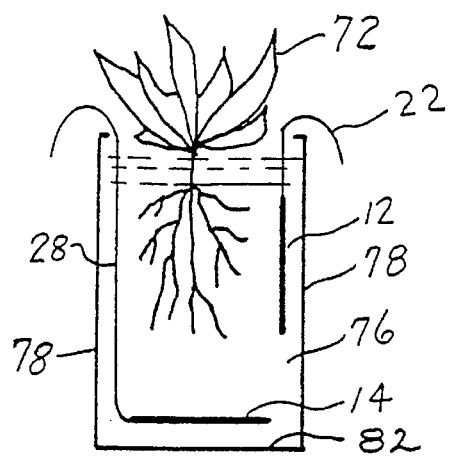
FIG. 5 is a side elevational view of a negative electrode disposed below the roots and a positive electrode disposed adjacent the stem of a plant in accordance with the methods of the present invention.

Referring now to FIGS. 3–5, FIGS. 3 and 4 illustrate positioning a plant 72, as shown in FIG. 3, or a plurality of plants 74, as shown in FIG. 4, between positive electrode 12 and negative electrode 14. As shown in FIGS. 3 and 4, electrodes 12, 14 are positioned along the side of the plant submerged in a media 76 housed in a container 78 or 80. In FIG. 5, the negative electrode 14 is disposed adjacent the bottom 82 of container 78 with positive electrode 12 being disposed adjacent the surface of media 76. Negative electrode 14 is below the roots 84 while the positive electrode 12 is more adjacent to the stem 86. Lead wires 22, 28 extend to pulse generator 16 (not shown in FIGS. 3–5) from electrodes 12, 14, respectively.

Referring now to FIG. 6, the plant stimulator 16 is shown housed within the wall 90 and bottom 92 of container 88. Positive electrode 12 is disposed within the upper portion of wall 90 and exposed to the interior of container 88 so that it is in electrical engagement with the media 76 such as soil. Electrical lead 22 extends through the wall 90 to the bottom 92 for connection to pulse generator 16 housed within the bottom 92 of container 88. The power source 18 is electrically connected to pulse generator 16. The negative electrode 14 is disposed within the floor 94 of container 88 with electrical lead 28 being connected to pulse generator 16. Power source 18 would be a small battery such as a watch battery. A drain hole 96 would be provided through floor 94 and bottom 92 to allow drainage from container 88.

Figure 15:
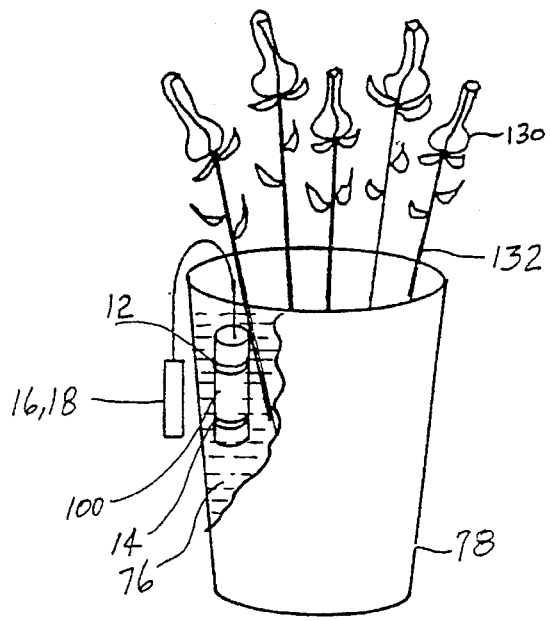
FIG. 15 illustrates the flowers in media shown in FIG. 10 utilizing the probe illustrated in FIG. 7 in accordance with the methods of the present invention.

Referring now to FIG. 7, there is shown a probe or wand 100 housing both electrodes 12, 14. Wand 100 is made of a non-conductive material with positive electrode 12 disposed within the non-conductive material adjacent the upper end of wand 100 and negative electrode 14 is housed within the non-conductive material adjacent the lower end of wand 100. A conduit 102 extends down through the non-conductive material of wand 100 with lead wire 22 being electrically connected to positive electrode 12 and lead wire 28 being electrically connected to negative electrode 14. In this embodiment, as distinguished from the embodiment shown in FIGS. 3–5, the electrodes 12, 14 are housed in a single housing such as wand 100 which may be submerged into the media 76 for generating current through the media 76 in a container of plant or plant parts such as are illustrated in FIG. 15 hereinafter described in further detail.

Figure 17:
FIG. 17 illustrates a self-contained, extendable apparatus of the invention.
Figure 17:
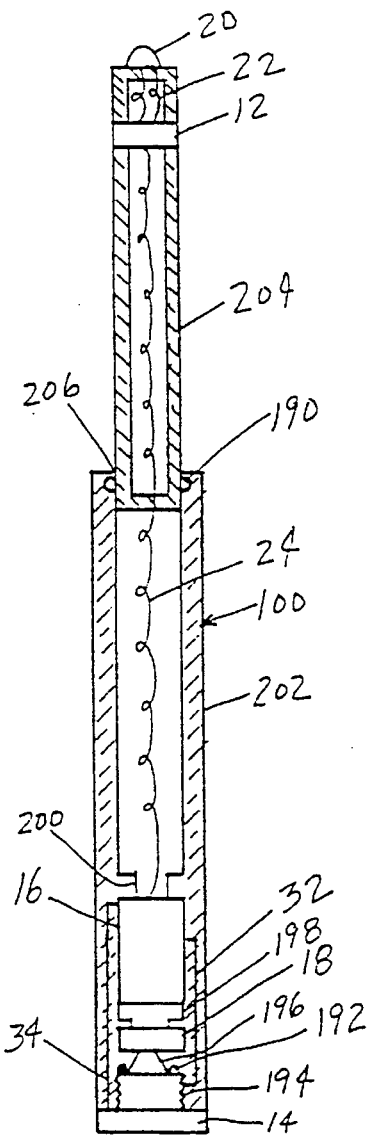

Referring now to FIG. 17, a wand 100 as described above is depicted wherein the power supply 18 further comprises a self-contained battery within wand 100. A two-piece housing 202, 204 is provided which may be extended in order to variably position the positive electrode 12 at increasingly greater distances from negative electrode 14. A water-tight joint 206 joins the two-piece housing 202, 204 at a washer 190. Negative electrode 14 is operably connected to a power supply such as a watch battery 18 through leads 32 and 34. Threaded cap 194 allows access to power supply 18 and serves to complete the circuit between electrode 14 and generator 16 through lead 32 and contact 196. Washer 192 provides for a water-tight seal for cap 194. Power supply 18 is supported by flange 198. Flange 198 also supports generator 16 as does flange 200. In this embodiment lead 24 is a coiled wire allowing extension of the housings 202, 204.

Referring now to FIG. 8, the plant stimulator 10 is shown having the positive electrode 12 affixed directly to the plant part or Christmas tree 104. Positive electrode 12 is shown attached to the stem of the upper portion of the tree 104. Such attachment may be made by a screw which penetrates the stem of the tree 104 and operably completes the circuit between the positive electrode 12 and negative electrode 14 through the tree's vascular system. The negative electrode 14 is shown housed within a container 106 for tree 104 which contains a media 107 for the tree. Lead wires 22, 28 extend to pulse generator 16 and power supply 18.

As can be appreciated, electrodes 12, 14 may take various forms and may be positioned at various locations to induce a current either through the media 76 or plant part 72 to accomplish plant stimulation in accordance with the present invention. Additionally, a plurality of apparatus may be applied to a single plant or plant part in certain embodiments.

Methods

Thus, in one embodiment, electronic apparatus 10 delivers a predetermined discrete pulse of current to the plant, plant part or the medium that the plant is being grown or stored in. The electrodes 12, 14 are placed in a growing medium 76 such as soil, hydroponic solution, or the support medium for harvested plant pans, such as the culture medium for tissue culture or water used to store cut flowers. For instance, one pair of electrodes 12, 14 is used for container grown crops while multiple electrode pairs are used for field grown crops. Composition and design of the electrodes 13, 14 is also dependent on the nature of the application. For instance, in applying current to cut flowers, a looped coil copper electrode serves well for the negative electrode 14 while a one-half inch straight tungsten electrode serves best as the positive electrode 12. In potted plants, straight copper electrodes serve well for both electrodes 12, 14. In other applications, it may be best to use gold plated electrodes.

In growing plants the electrodes 12, 14 are placed in a manner so that the root zone occupies the space between the electrodes 12, 14 thus allowing for maximum exposure to the current. This method can be accomplished in container grown plants or in field grown crops. When pulsed current is applied in this manner, accelerated growth rates and enhanced plant color development are obtained.

In the storage of cut flowers, the negative electrode 14 is placed adjacent the bottom of the storage container and the positive electrode is preferably immersed in the upper one inch of the growth medium (water). This provides the maximum exposure of the plant material to the current.

In the preservation of live cut Christmas trees, the negative electrode 14 is placed in the Christmas tree stand water and the positive electrode 12 is attached to the upper portion of the tree using any method that allows the penetration of the electrode through the bark so that contact is made with the vascular system of the tree such as with a metallic screw. By using the methods and apparatus of the invention, trees remain fresh for a longer period than by prior art methods of treatment and there is a reduction in needle drop associated with the death of the tree.

In certain embodiments, the application of electrical current to the apparatus 10 produces a negative pulsed charge that is propagated through whatever medium 76 the plant or plant part is grown or stored in, thus completing the circuit between the negative and positive electrodes 12, 14. The resistance of the growing or storage medium 76 will effect the total current available to the plant or plant part. For instance, water is much more conductive to current flow than semi dry soil and water containing fertilizer is more conductive than tap water. The apparatus 10 must therefore allow adjustment of the current output to the electrodes as well as controlling the pulse rate of the current.

In certain embodiments, the pulse of the current is important as it is proposed that by timing the application of the current to the plant or plant parts, a cyclic flux in the ionic state of the plant membranes is accomplished. It is further proposed that this cyclic flux aids in the uptake of nutrients and the movement of fluids through the plant by stimulating the active transport system of the plant. Further, it is proposed that the current flux produces ionic changes in certain salts such as potassium, calcium and nitrate, and possible a polarity shift in water that make those essential items more permeable to the plant's membrane system. The invention promotes growth in living plants and extends the life functions of harvested plant material by discrete application of electrical current. Pulsed currents create ionic flux in the membrane system of the plant and alter the ionic state of certain salts and fluids external to the plant making them easier for the plant to assimilate.

The methods and apparatus of the invention utilize the natural negative charge of plants and cut flowers. It is believed that the use of the apparatus 10 establishes an electron flow through the vascular system of the plant or flower and creates a condition known as electroosmosis aiding in the movement of molecules through the plant's vascular system. This movement helps the cut flower or plant to enhance or reestablish the movement of water and other molecules throughout the plant. Initial studies indicate that the method will extend the usable shelf life of fresh cut flowers 3–5 days over conventional storage. These results will be further discussed in the examples to follow.

It is also proposed that bacterial growth in the storage containers is reduced or restricted during the application of the current. This reduction of the bacteria in the vase water delays the decomposition of the stems normally seen in conventional storage methods.

Growth Media

The invention uses two or more spaced electrodes 12, 14 in a conducting medium to complete a circuit. This conducting medium can be any medium in which a plant or plant part may be grown or stored. For the purposes of the invention, this can include any of the following.
1. Fluids.

The electrical properties of water are dependent on a number of factors. Laboratory produced ultra pure water is a very poor conductive medium. However as ions or impurities are added or dissolved in the water, the conductivity increases. Most naturally occurring water is a fairly good electrical conductor due to the dissolved salts such as iron, sodium, copper, and zinc, that are found in the water. Water used by plants also carries a wide range of dissolved salts. These salts are used as nutrients by the plant to carry out life functions.

Plants can be grown by using only a nutrient loaded water solution. This is commonly referred to as hydroponics. This process consists of applying the nutrient water solution to the root zone of the plant by either constantly submerging the roots or by the intermittent application of the fluid by spraying or flooding. The practice is widely used in the production of plant crops ranging from lettuce to roses. The process allows a very precise control of the nutrient levels that are available to the plant and thus gives some control on the growth rate and production cycle that is not present in field grown crops.

Tap water is typically used for the storage of plant parts such as cut flowers. This water normally has good conductivity but will vary greatly from source to source.

Cut flowers are typically harvested and placed in large containers of tap water and in coolers shortly after harvest. They remain in the water until they are shipped. After shipping they are again placed in water where they remain in water for the duration of their useful life.
2. Soils.

By far the largest portion of all plants are produced in some type of soil. This includes all field grown crops as well as greenhouse crops. Soils can be described as any number of aggregate compositions consisting of sands, clays and organic compost such as peat moss that is suitable for growing plants.

One of the critical factors in determining the quality of a material or aggregate mixture to serve as a soil is its ability to hold and release water. This is typically dependent on the size of the particles of the soil and the ratio mix of sand, clay and organic compost in the mix. Typically, the finer the mix of particle size the greater the water retention of the mix. This is a result of capillary action and surface tension of water between the individual particles. The larger the individual particles and the greater the space between the particles, the faster water will drain through the mix. For example, soil with a high ratio of large grain sand will drain water at a much faster rate that a soil than contains a high ratio of clay. Another property of soils is their ability to release desired nutrients into the water that the plants use for growth.

In common usage today are a number of soil substitutes such as vermiculite, perlite, pure peat moss, and artificially produced foams that are used to grow plants. Most of these artificial soils do not supply any nutrient value but merely provide a support for the root system of the plant. Plants grown in these artificial soils are dependent on the application of fertilizers for their nutrients. In many cases these artificial soils are used as additives to conventional soil to increase the soil's ability to handle water in the desired manner. Whatever its constituency, so long as the soil acting as a growth medium can conduct a current, it is included within the definition of such media.

Under conditions in which tissue culture plants are grown or stored in a solid or semi-solid material, typical practice involves removing a selected part from the parent plant and placing it on a solid or semi-solid support medium that contains the necessary nutrients and sugars that the plant requires for life support. This solid or semi-solid support material can be made by adding agar, gelatin or any other gelling agent to a nutrient loaded, water-based solution. This gelled medium provides a solid support for the tissue while providing the water and nutrients that the tissue requires for growth.

Particular Methods for Using the Invention

As has been discussed, most of the methods that are utilized for the growth or storage of plants or plant parts require the presence of water. Using water as a conductive agent, the current invention applies a pulsed current to the plant or plant parts being grown or stored in any fluid, soil, solid or semi-solid. Various applications envisioned are:

1. Hydroponic application for plant growth.

Referring now to FIGS. 3–5, The current invention may be used in the hydroponic production of plants by placing two or more electrodes 12, 14, one positive and one negative, in the nutrient solution 76 in which the plant 72 is grown. The plant 72 may be placed in a position in the solution 76 that is between the electrodes 12, 14 thus allowing the plant 72 to be in the direct line of current flow as shown in FIGS. 3 and 4. The size or shape of the electrode 12, 14 that may be used will vary with the size of the container 78 and ionic strength of the solution 76. Electrodes 12, 14 may be produced which accommodate large scale operations where many plants 74 can occupy the space between two electrodes 12, 14 as shown in FIG. 4.

Figure 9:
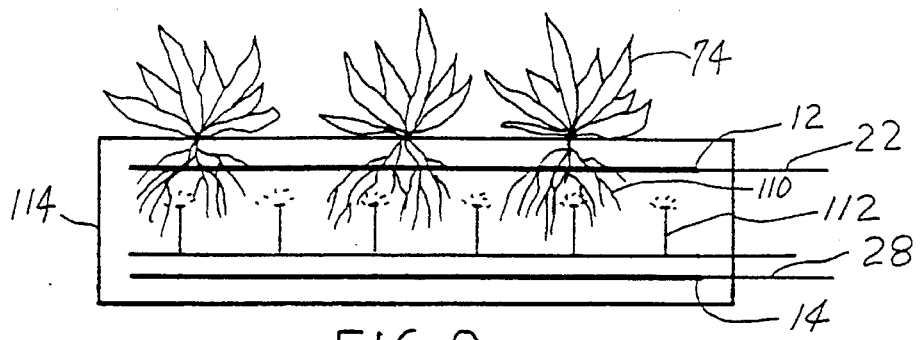
FIG. 9 is a side elevational view of a plurality of plants in hydroponic solution with an electrode at the roots and another electrode at the base of the stem, where spray is utilized as the conductive medium in accordance with the methods of the present invention.

Referring now to FIG. 9, in hydroponic applications where the nutrient solution is only applied intermittently, the electrode configuration would be slightly different. In that case, the electrodes 12, 14 would be placed in a manner where the root system 110 of the plant 74 is in direct contact with at least one of the electrodes 12, 14, preferably the negative electrode 14. The positive electrode 12 would be positioned in a manner that would allow a completed circuit to be formed as the run off from the spray solution, provided by spray heads 112 onto the plants 74 supported by plant support 114, simultaneously contacted both the plant and the plant development medium.

Importantly, the current invention may be practiced to allow for different electrical potentials that are presented in different nutrient solutions 76, differently sized and shaped growing areas and methods associated with hydroponic plant production. Where necessary, the electrodes 12, 14 used in the applications in hydroponics would be constructed of conductive material that would not degrade in the presence of the nutrient solution or the current.

2. Pot grown crops.

Figure 10:
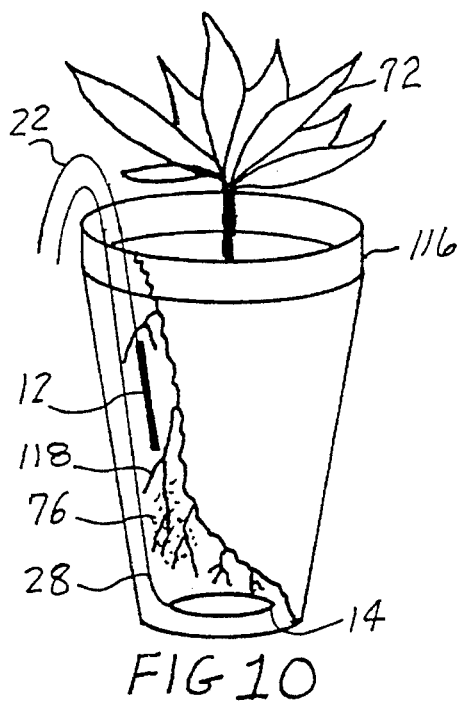
FIG. 10 is a side elevational view of a potted plant with one electrode at the base and another electrode adjacent the top soil, in accordance with the methods of the present invention.

Referring now to FIG. 10, the present invention may also be used in the culture of pot grown plants 72. This is accomplished by the placement of two or more electrodes 12, 14 in the pot 116 used for growing. The electrodes 12, 14 are positioned in a manner that allows for maximum exposure of the root zone 118 to the flow of current between the electrodes 12, 14. The electrodes 12, 14 may also be positioned on the probe or wand 100, shown in FIG. 7, where they are separated by a non-conductive material.

Figure 11:
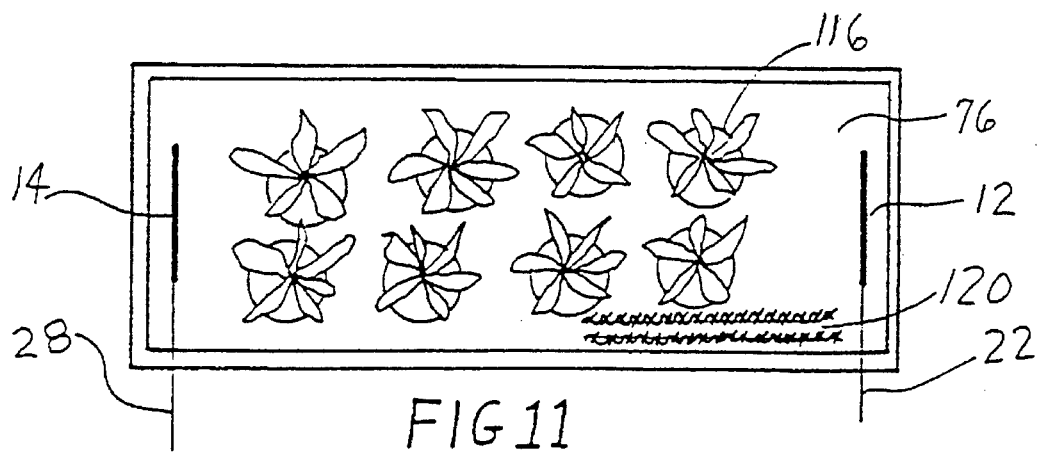
FIG. 11 is a top view of a plurality of potted plants positioned on a capillary mat having electrodes at each end thereof for practicing the method in accordance with the present invention.

Referring now to FIG. 11, for large scale production in pots, a plurality of pots 116 may be positioned on a capillary mat 120 that is connected to the electrodes 12, 14 thus providing multiple pots with current flow. Similarly, individual pots may be produced in a manner that incorporates the entire apparatus in the construction of the pot, where the pot may include the electrodes 12, 14, power supply 18 and pulse generator 16. This construction eliminates any visible, external sign of the apparatus (see FIG. 6).

3. Field grown crops.

Figure 13:
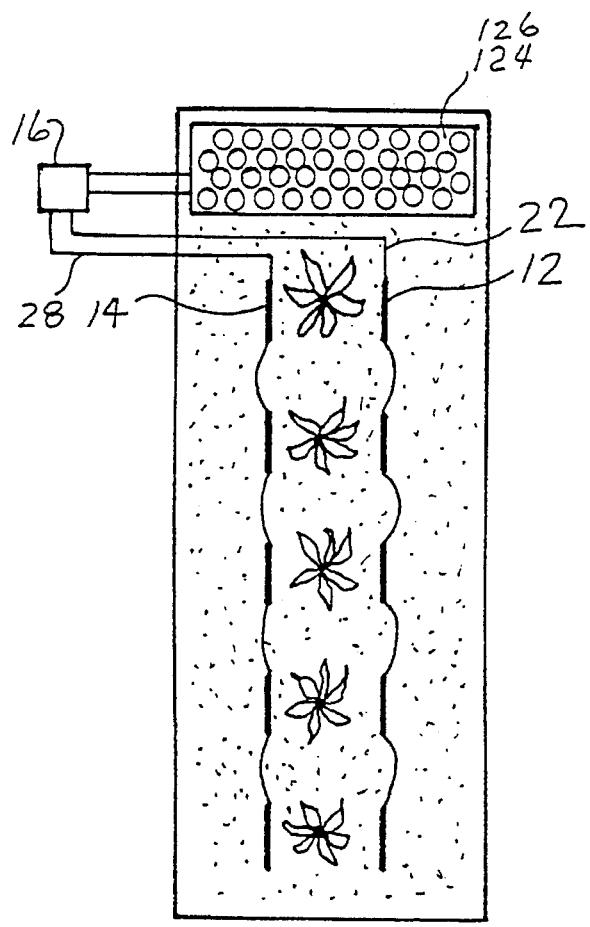
FIG. 13 is a top view of a growing area of field crops showing the positioning of the electrodes powered by solar energy in accordance with the methods of the present invention.
Figure 12:
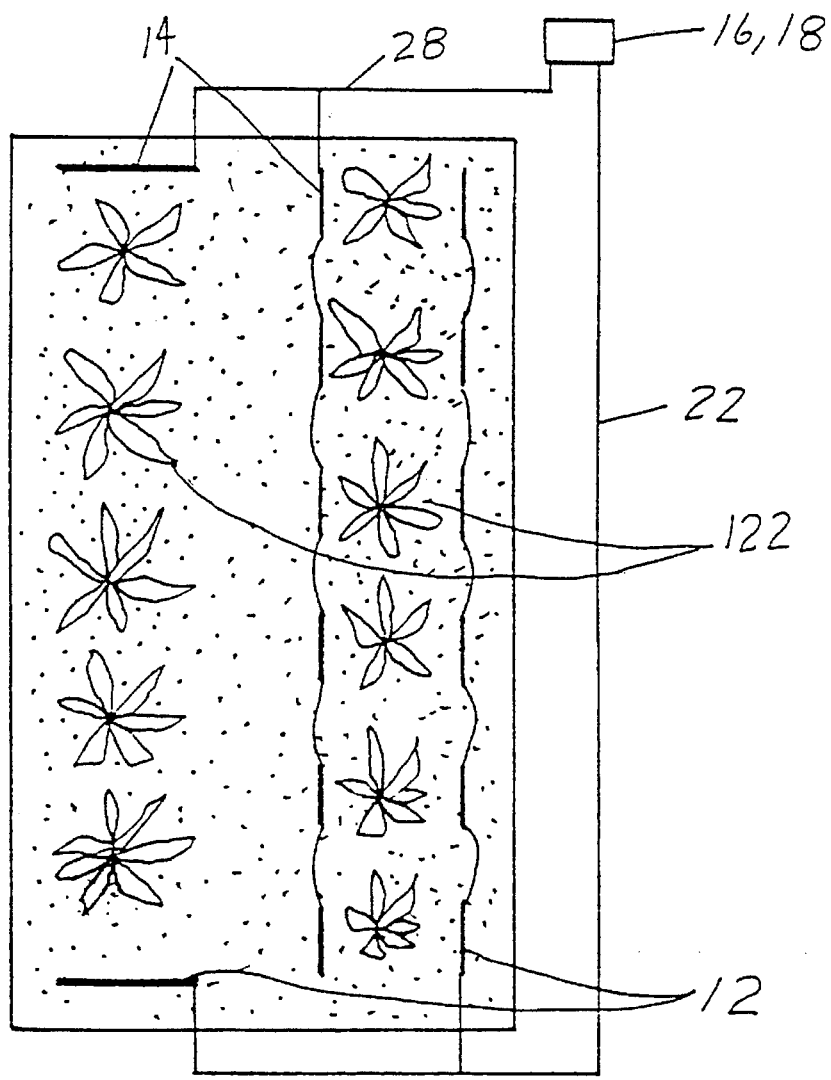
FIG. 12 is a top view of a growing area for field crops showing the positioning of the negative and positive electrodes in accordance with the present invention.

Referring now to FIGS. 12 and 13, the present invention may also be applied to field grown crops by the appropriate spacing of the electrodes 12, 14 in the field. Electrodes 12, 14 are placed at appropriate spaces throughout the growing area 122. They are positioned in such a manner as to provide maximum exposure to the root zone of the growing plants. Power for these electrodes 12, 14 may be supplied by conventional line sources such as battery or line current or by solar, wind or other power sources in the field. FIG. 13 illustrates the use of solar collectors 124 and solar panels 126 for power source 18. This embodiment may also be used by the home gardener, including uses in flower beds, vegetable gardens, individual trees and lawn areas.

4. Storage of Fresh Flowers and Other Harvested Plant Parts.

Figure 14:
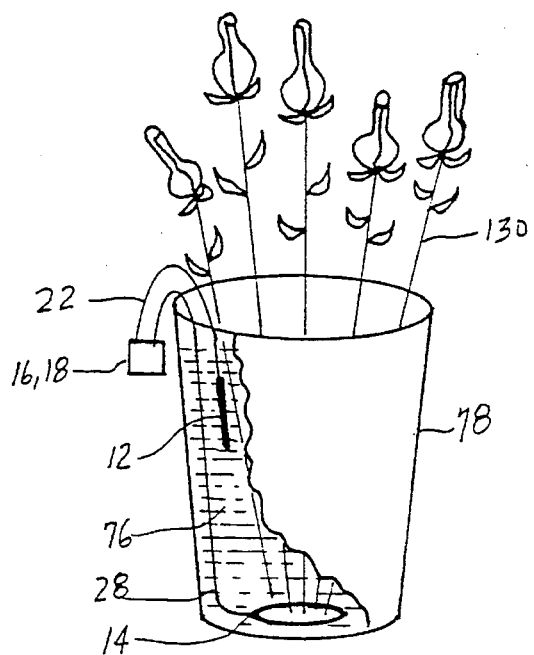
FIG. 14 is a side elevational view of cut flowers in a media with a negative electrode at the base of the flower container and a positive electrode adjacent the surface of the media practicing the methods of the present invention.

Referring now to FIGS. 14 and 15, the present invention is particularly useful when used to extend the shelf life of fresh cut flowers and other plant parts 130. This is accomplished by placing two or more electrodes 12, 14 in a vase or container 78 in which the flowers 130 are stored. The electrodes 12, 14 are positioned in a manner that allows for maximum exposure of the stems 132 of the flowers 130 to be exposed to the current. The electrodes 12, 14 may also be placed on the probe or wand 100 shown in FIG. 7 where they are separated by some non-conductive material.

Individual vases or containers 88 may also be produced in a manner that incorporates the entire apparatus in the construction of the container. (see, FIG. 6) Such a design would include the electrodes 12, 14, power source 18 and pulse generator 16. This construction also eliminates any visible external sign of the apparatus 10.

The entire apparatus 10 may be fashioned in a manner that allows it to be dropped into a vase or other container 78 as shown in FIG. 7 or 17. This embodiment is water proof and may have an internal power source such as a battery. In this embodiment of the invention, the electrodes 12, 14 and separated by a non-conductive material such as plastic. The design varies depending on the nature of the containment vessel 78 in which it is to be used. The apparatus 10 of the invention may also be designed in a manner that will allow several containers to be provided with current from one power/pulse source. This would allow multiple electrodes to be driven from one power source while providing current to several independent containers.

The present invention may also be used to prolong the freshness of fruits or vegetables. This is accomplished by positioning the electrodes 12, 14 in a manner that exposes the plant material to the maximum flow of current. For example, the storage and marketing of leaf lettuce has particular usefulness. The electrodes 12, 14 are positioned in a bed of very wet ice and the lettuce is displayed on top of this ice bed. The melt water provides both the moisture for the lettuce and the conductive material 76 for the current.

The present invention may also be used to prolong the freshness of cut trees 104 such as Christmas Trees, such as shown in FIG. 8. This is accomplished by placing the negative electrode 14 of the invention in the water reservoir 107 of the tree stand 108 and attaching the positive electrode 12 to the upper part 109 of the tree 104.

Thus, the present invention relates to methods of promoting the development of a plant 72 or a part of a plant 130. As used herein, development of a plant or a part of a plant means the natural progression found at any stage of a plant's life cycle as it would occur without the stimulus of an electrifying current. Where whole plants develop from seed to plantlet, to mature plant, to flowering and finally to senescence, development of the plant along any portion of this life cycle may be one which is promoted using the methods of the invention. For instance, in certain embodiments, a pulsed electrical field may be applied to a plant development medium which contains seeds in order to promote the development of these seeds into plantlets with rudimentary shoots and roots. Similarly, where pre-flowering plants are treated by the pulsed field methods of the invention, the promotion of flower development including budding, pollen set, opening and fruit or seed development is achieved.

The present invention also relates to methods for maintaining the freshness of plants or parts of plants. As used herein, freshness of a plant or plant part refers to normally understood indicia of fresh produce and cut flowers. A plant or plant part is understood herein to lose its freshness when certain indicia are demonstrated such as the loss or withering of leaves, petioles, petals, sepals and the like. It may also be indicative of loss of freshness when a plant or plant part exhibits a weakness in a stem portion due to a loss in the turgor pressure of the stem portion. In the more advanced stages of loss of freshness, rotting or spoilage of the plant or plant part is observed.

One general embodiment relates to methods of promoting development or maintaining freshness and is the same in each case, whether it is applied to plants or their parts alone. These methods comprise creating a pulsed electrical field in a plant development medium, where the medium is capable of conducting electricity and then contacting the plant or plant part with the medium.

For the purposes of the invention, a pulsed electrical field is one in which a discontinuous current is applied to the plant development medium. Contrastingly, the plant development medium in certain embodiments may also be subjected to a continuous electrical field. The pulsed electrical field can be varied as to the frequency of the pulses of electricity by modifying the electrical circuit which generates the field. A slower pulse rate provides a longer time for recovery of the electrical potential of the plant cellular membranes across which translocation is occurring. A faster pulse rate reduces such recovery time. Thus, for different plants and plant parts, it is possible to adjust the pulse rate necessary to maximize translocation across the plant membranes.

The plant development medium of the invention is defined as any medium which is capable of conducting a current and supporting the development of a plant or plant part. Such a medium may consist of any of the circuit completing media discussed above including water, nutrient solution, sprays, soils, soil substitutes, and tissue culture media. In the case of initially non-aqueous media, such as soil and soil substitutes, the addition of sufficient water or nutrient aqueous solutions to allow the soil or soil substitute to conduct an electrical current will suffice as a plant development medium for purposes of the invention.

For the purposes of the invention, the ability of a plant development medium to conduct electricity may be continuous as in the case of a vase of water or nutrient solution. However, a plant development medium may be capable of conducting a current of electricity at some times and not at others. Such cases may occur when a soil cycles through various levels of hydration as when a potted plant may be fully capable of conducting a current initially after a thorough watering of the plant in the pot and may thereafter dry out and lose its ability to carry the current. In any case, the capability of carrying the current may be reinitiated simply by rehydrating. Similarly, soils such as in flower beds, vegetable patches, and field grown crops may undergo cycles of hydration. Hydroponic applications where discontinuous spraying takes place may also be subjected to cycles of hydration. In all such cases, these plant development media regain their ability to conduct a current and are therefore included within the definition of media capable of conducting electricity.

One embodiment relates to a method which requires contacting the plant or part of a plant with the medium in order to expose the plant or plant part to the electrical field. In certain embodiments the contacting of the plant or plant part with the medium will comprise actual insertion of the plant or plant part into the medium. For instance, seeds may be fully immersed in a wetted soil as a plant development medium through which a pulsed current is passed. Alternatively, the plant or plant part may only contact the medium along a portion of the plant or plant part. For instance, cuttings which require rooting may be placed in a wetted vermiculite and subjected to the electrical filed. In a preferred embodiment, cut flowers and greens may be placed in a vase with water as the plant development medium and subjected to the electrical fields of the invention. Also, as described above, the contact of the plant or plant part with the medium may itself be intermittent such as where cycles of wetting and drying take place or where hydroponic spraying is utilized. In any case, the required contact step is achieved when contact of the plant or plant part or a portion of either is exposed to a completed circuit comprising the electrical field in the plant development medium.

As discussed above, in certain embodiments the method is carried out where the medium further comprises water. The aqueous plant development medium is necessarily one which will conduct a current of electricity, thus there must be at least some dissolved ions. Most sources of water readily available to growers contain enough dissolved ions to conduct a current. When water is the plant development medium, it may be utilized as a part of a solution further comprising a horticultural preservative. A wide variety of such preservatives are available and known well to those of skill in the horticultural arts such as silver thiosulfate, copper sulfate, heavy metal solutions and other anti-microbial compounds.

As described above, the methods of the invention may be carded out on parts of plants such as a plant stem 132. Of particular interest in this regard are applications of the methods of the invention to plant stems 132 further having flowers. Similarly, the plant part may further comprise an evergreen tree trunk separated from its root portion, such as a Christmas tree 104.

Where the methods are applied to stems 132 comprising flowers, it will be understood by the skilled artisan that a flowering stem may be one which has a fully developed bloom. However, of particular advantage in the present invention is the use of stems comprising buds of flowers yet to develop. Surprisingly, when the methods of the invention are applied to early bud stems, the buds respond to the electrical fields by continuing to develop approximately as they would if the stem remained connected to the parent plant, at least for a period of time in excess of that without the electrical stimulus.

A method of promoting the development or maintaining the freshness of plant parts is also described which comprises the steps of creating a continuous electrical field in a plant development medium capable of conducting electricity and then contacting the plant part with the medium. In certain instances, it may be preferable to expose a plant part such as a stem in an aqueous plant development medium to continuous electrical fields rather than to pulsed electrical fields.

Figure 16B:
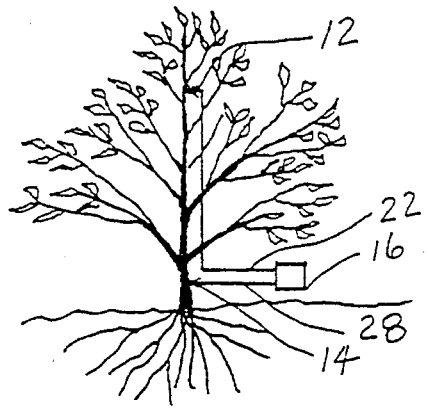
FIGS. 16A–16B illustrate use of the apparatus and methods of the invention to apply current directly to a plant part (A) or plant (B)
Figure 16A:
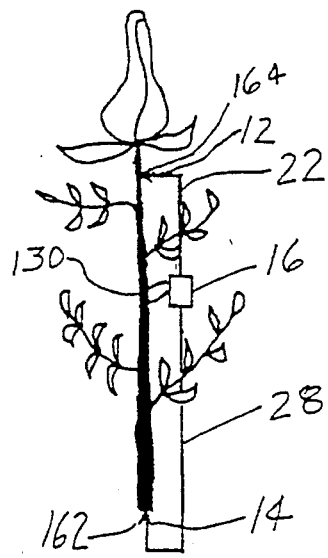

Similarly, it is possible to utilize the methods of promoting the development or maintaining the freshness of a plant or a part thereof without the necessity of contacting the plant or plant part with a plant development medium. In this embodiment, as depicted in FIGS. 16A and B, the pulsed electrical field from the pulse generator 16 is established by directly using the plant or plant part to complete the circuit between positive electrode 12 and its lead 10 and negative electrode 14 and its lead 28. For instance, if a flowering stem is to be treated by this method, a negative electrode 14 may be inserted using probe 162 in a portion proximal to the cut end and a positive electrode 12 may be placed at a position distal to the cut end using probe 164. So long as the vascular systems of the plant are capable of completing the electrical circuit between the two electrodes, an electrical field may be generated without the need for a plant development medium. An attachment 160 may be finally fitted on the plant part to secure the apparatus thereto.

Methods of particular utility are provided by the present invention which reduce or eliminate the need for refrigeration of plant parts in order to maintain freshness. While in preferred embodiments, both refrigeration and the methods and apparatus of the invention are utilized jointly to maximize the viable life of flowering stems, there are numerous situations as described above where there is little if any availability to refrigeration. Typically, bucket vendors and other non-traditional flower markets such as department stores will not have nor desire the additional expense of refrigeration to maximize cut flower viability. In those instances, the methods and apparatus of the present invention may be used with little or no refrigeration in order to attain maximum freshness for extended periods. Methods of promoting the development or maintaining the freshness of a plant part from a harvest site to a marketing site are also provided where the methods comprise: harvesting the plant part at the harvest site; contacting the plant part with a plant development medium capable of conducting electricity; creating an electrical field in the medium; and, transporting the plant part in the medium thus electrified to the marketing site. In other embodiments, where it is not feasible to maintain the contact of the plant part with the medium during transit, methods are provide which directly contact the electrical current source to the vascular system of the plant part.

Apparatus 10 for creating pulsed electrical fields in plant development media capable of conducting electricity are also provided. These apparatus 10 generally comprise a first and second electrode 12, 14 and an electrical pulsed current generator 16 which is operably linked to the electrodes 12, 14. The apparatus 10 may take a large number of forms so long as the basic elements as described are included. Thus, as described herein, the apparatus 10 may be a compact unit suitable for use on small vases and pots 78. Alternatively, where it is necessary to treat large numbers of plants 72 or parts of plants 130 simultaneously, the apparatus 10 may be of a more substantial size as necessitated by the power source, the electrode surface area required, or the necessity to reach multiple plants or plant parts with a single apparatus.

The apparatus 10 of the invention are in certain embodiments capable of delivering a pulsed current of electricity into a conductive material 76. In a general embodiment the electrical field of the invention is one which the electrical current generator preferably supplies no greater than about 5 volts in order to avoid shocking a user. Where the current is pulsed, the electrical current generator 16 pulses at a range of rates of about 10–30 hertz and preferably 14–20 hertz. In certain embodiments practiced with cut flowers and potted plants, about 20 hertz is preferred. In other embodiments practiced with cut Christmas trees 104, about 14 hertz is preferred. When current is measured in the plant development medium or in the plant part as generated using the apparatus, results vary according to the resistance afforded by each circuit. Thus, plant development media comprised chiefly of water, were observed to support a current of less than 1 amp, typically in the 30–70 milliamp range. When plant parts (i.e., stems) were tested, various types of stems supported currents of generally less than 2 milliamps, typically in the 0.02–2.0 milliamp range.

Where a continuous electrical field is required, the apparatus 10 of the invention are similar to that described above except there is no need for the electrical current generator 16 to be one which delivers a pulsed field. Where no plant development medium is used to complete the required circuit, the apparatus 10 of the invention are applied directly to the plant 72.

Regardless of the method which is selected from those described above to produce a plant 72 or plant part 130, the resulting plant 72 or part 130 thereof may be produced by the selected method. Such plants 72 or plant parts 130 are claimed when produced using the methods of the invention. Thus, where the methods of the invention are used at a retail level to promote the development of a plant or plant part or to maintain the freshness of a plant part 130, these products of the methods are claimed herein. The present invention is, therefore, not limited to a particular point of application during the traverse from harvest to ultimate consumer nor at which point the methods are applied.

The present invention also relates to methods and apparatus for handling, shipping and marketing flowers and greens that have been cut at peak viability so that optimum freshness is achieved. The method begins with the handling of the flowers immediately following cutting and ends with preparation of the flowers for display and retail sale. As flowers are typically grown in locations that are geographically remote from their ultimate sale destinations, the present method addresses the handling of flowers to minimize the deterioration of the flowers during shipment and marketing.

At the flower farm, the stems of the cut flowers may be placed in preservative solutions for a period of time. During this time, the methods and apparatus of the invention may be applied. Preferably, this and all subsequent treatment on the farm occurs under refrigeration. Following removal of the stems from the preservative, the flowers are typically bulk packed in shipping boxes. Alternatively, the flowers may be "precooled" for approximately thirty minutes before shipping. Throughout the processing period from the grower to the processing facilities, the flowers are kept refrigerated when possible.

Once the flowers arrive at the processing facilities, they are unpacked. The stems of flowers that are not damaged are cut, preferably under water to prevent the formation of air bubbles on the end of the cut stem, and preferably with a sharp blade, to avoid crushing the stem end. This represents another stage at which the apparatus and methods of the invention may be used.

Typically following recutting, the freshly cut flower stems are placed in a hydration solution at room temperature. An example of a hydration solution is made by using HydroFlor™ (Floralife, Inc. of Burr Ridge, Ill.). The stems are left in the hydration solution for a period of time. This represents another stage at which the methods and apparatus of the present invention may be applied. Following treatment with the hydration solution, the flower stems may be transferred to preservative solutions which again represent stages at which the apparatus and methods of the invention may be applied. Of course, after delivery to the final retailer and consumer, the methods and apparatus of the invention can be used as described above.

Kits for promoting the development or maintaining the freshness of a plant 72 or a plant part 130 are also provided. These kits comprise apparatus for creating pulsed or continuous electrical fields in plant development media, sources for supplying electrical current to the apparatus 10, plant development media 76 or recipes therefor and, instructions for creating the field in the medium using the apparatus 10. Where the methods of the invention are used to treat plant parts 130, kits are provided which may utilize a continuous source of electrical current. Certainly, combination kits may be achieved where the user may select from a continuous versus a pulsed electrical field. In another embodiment, kits are provided which do not require plant development media 76 where the purpose of the kit is to directly treat the plant 72 or plant part 130 without an additional element in the circuit.

EXAMPLES

Example I

Seedlings

Seeds of marigolds, tomatoes, lettuce, coleus, poppy, and impatiens were obtained. Each seed package was randomly divided into two equal groups of seeds. Twelve covered planting trays were then prepared using a peat moss/perlite potting mix. The trays were filled to a depth of one and one half inches with the mix and then moistened with tap water. In six of the trays, electrodes 12, 14 connected to a pulse generator 16 were inserted to a depth of one inch on opposite ends of the tray. The negative electrode 14 on each tray consisted of a three and one half inch piece of ten gauge copper wire. The positive electrodes 12 each consisted of a three and one half inch by one eighth inch tungsten rod. These were connected to the pulse generator 16 by twenty-two gauge insulated copper wire.

One set of seeds were planted in the trays containing no electrodes and the corresponding seeds were planted in the trays containing the electrodes. The trays were moistened again to assure good soil to seed contact.

The trays were then placed under standard cool white florescent lights at a distance of one foot. Lights were operated on a cycle of fourteen hours on and ten hours off.

Each tray was covered with a clear plastic cover to retain moisture and increase the internal temperature. A constant day temperature of 76° F. and a night temperature of 71° F. was maintained. The covers were removed after ten days and the trays were watered with a dilute 14-12-14 fertilizer solution prepared according to manufacturer's directions. Additional water and fertilizer was added to all trays in equal volume and at the same time for the duration of the experiment based on the plants' requirements.

In each case, the trays containing the electrodes 12, 14 were connected to a pulse generator 16 supplying 1.3 volt pulsed at the electrical voltage source at a rate of 20 hertz. This source voltage was applied for the duration of the experiment. The actual current in the trays was recorded as 450 millivolts.

No differences in the rate of germination were noted between control seeds and the treated seeds. However, greater numbers of seeds germinated in the treated as compared to the control group of seeds.

|  | Number of Seeds Germinated | |
| --- | --- | --- |
| Plant Variety | Treated | Control |
| Marigolds | 22/30 | 15/30 |
| Lettuce | 34/40 | 26/40 |
| Tomatoes | 26/30 | 22/30 |
| Coleus | 18/20 | 15/20 |
| Poppy | 17/20 | 12/20 |
| Impatiens | 37/40 | 30/40 |

No noticeable difference occurred in the seedlings development during the first few days of growth. As the seedlings began to develop their secondary leaves, however, noticeable differences began to appear. The seedlings in the trays with the electrodes developed a darker green than those in the control trays. This differential greening intensified as the plants continued to develop.

By the end of the second week of growth, other developmental differences were observed. All of the seedlings in the control group were noticeably shorter than the corresponding seedlings in the treated group receiving current. Additionally, treated seedlings developed thicker stems and greater leaf spans than the controls seedlings. These increases in height, stem thickness, color intensification, and leaf span continued for the duration of the experiment.

At the end of sixty days, the experiment was terminated and various measurement and observations were recorded. Averages for plant height and leaf span were taken on all plants as well as general observations on stem thickness, color and root development.

|  | Height | | Leaf Span | | Color | | Stems | | Roots | |
| --- | --- | --- | --- | --- | --- | --- | --- | --- | --- | --- |
| Plant | Treated | Control | Treated | Control | Treated | Control | Treated | Control | Treated | Control |
| Marigold | 8.1 | 4.4 | 9.3 | 6.8 | VD | LC | S | T | H | L |
| Lettuce | 7.8 | 6.2 | 8.8 | 7.2 | MD | LC | NA | NA | H | L |
| Tomatoes | 8.1 | 7.4 | 6.3 | 4.5 | VD | MD | S | T | H | L |
| Coleus | 2.1 | 1.6 | 2.4 | 1.3 | NA | NA | S | S | H | L |
| Poppy | ½ | ½ | ¼ | ¼ | D | LC | S | T | H | L |
| Impatiens | ½ | ⅗ | 3.8 | 2.9 | VD | D | S | T | H | L |

All measurements are in inches. VD = Very Dark, MD = Medium Dark, D = Dark, LC = Light Colored, S = Strong, T = Thin, H = Heavy development, L = Light development, NA = not applicable.

All plants responded in some manner to the application of current to the root zone. The poppies showed the least response. It is believed that the growing temperature was higher than optimum for their growth. All the other plants responded in a positive manner.

Example II

Mature Plants

Six pots of African violets of the same size and variety were selected. Three of six pots were fitted treated with the methods of the present invention and with electrodes, one positive 12 and one negative 14. The negative electrodes 14 consisted of a 2 inch, ten gauge copper wire and the positive electrodes 12 consisted of a two inch by 1/8 inch tungsten rod. These electrodes 12, 14 were positioned opposite each other in the pots. The treated pots containing the electrodes and the control pots without current were placed under cool white florescent lights at a distance of one foot from the light source. A 12 hour day and ten hour night was maintained for the duration of the experiment. Day temperatures were maintained at 76° F. with a night temperature of 71° F. The pots were placed in separate water proof trays which were used to water the potted plants. The treated pots containing the electrodes 12, 14 were connected to a pulse generator 16 with twenty-two gauge insulated copper wire 22, 28 and a current at 1.3 volts at the source and 20 hertz. The actual current in the pots was recorded at 540 millivolts. This current was maintained for the duration of the experiment.

The plants were put on the same watering and fertilizer schedule. They were fed once a week with a dilute 14-12-14 fertilizer and watered as required. All existing blooms and buds were removed from all plants at the beginning of the experiment. After ninety days the experiment was terminated and observations were made.

Again, treated plants receiving current darkened considerably in relation to the control plants. The treated plants also produced a greater number of blooms and buds than the control group.

|  | Number of Buds | Number of Blooms |
|---|---|---|
| Treated |  |  |
| Pot 1 | 3 | 6 |
| Pot 2 | 4 | 7 |
| Pot 3 | 3 | 7 |
| Control |  |  |
| Pot 1 | 1 | 4 |
| Pot 2 | 1 | 5 |
| Pot 3 | 2 | 5 |

Example III

Cut Flowers

In order to determine the effectiveness of the present invention on extending the shelf life of cut flowers, the following sets of experiments were conducted.

Tests were conducted on roses, carnations, chrysanthemums and gladioli. Flowers were purchased in bunches and separated into random groups. Roses were purchased in bunches of twenty five and separated into two groups of twelve, as were carnations. Gladioli were purchased in bunches of twenty giving two groups of ten as were mums. All flowers were pretreated by removing the lower 2 inches of the stem with a sharp knife. These cuts were made at an acute angle to the stem allowing for the maximum exposure of the cut surface to the water.

One group of flowers was then placed in a vase according to the methods of the invention containing the device of the invention and the other group was placed in an identical vase without the apparatus. Equal quantities of water were added to both vases. Water was added as needed but was never completely changed for the duration of the experiment. Both treated and control groups were placed under identical environmental conditions.

Qualitative observations including the length of time that the flowers remained fresh, the quality of the water, and the rate of bloom drop or shatter (in those flowers that exhibit this response) were made throughout the experiment. Tests were run as long as the flowers were considered aesthetically attractive and marketable.

One measure of the effectiveness of the methods and apparatus of the invention was in measuring the shatter effect that many flowers exhibit after harvest. This effect is observed when the flower bloom sheds its petals. It is a normal post-harvest response in the development process of many cut flowers. Roses are especially prone to this response and it is not uncommon for cut roses to begin to exhibit this response within the first two days after harvest. Large flowered mums will also exhibit this response although they typically hold their petals longer than roses.

a. Shatter Results

Twenty-six tests on roses were conducted. All of the roses treated by the methods of the present invention suffered little or no bloom shatter. All the control roses on the other hand, exhibited normal shatter and by the end of each experiment all control stems lost at least a portion of their petals. Amount of loss varied from moderate to complete, leaving may stems with no petals.

Twenty-six tests were also conducted on mums and similar results were noted. All mums treated by the methods of the invention exhibited very little petal loss while the controls showed normal loss. The loss (shatter) was not as extreme in mums as in roses. Most of the control flowers retained as least a portion of their petals.

b. Maintaining Freshness

The following results were recorded concerning the total number of days the flowers were fresh. The following results were recorded on twenty sets of tests. Results are recorded as days of usable vase life or freshness.

|  | Roses | | Carnations | | Mums | | Gladioli | |
|---|---|---|---|---|---|---|---|---|
| Test No. | Treated | Control | Treated | Control | Treated | Control | Treated | Control |
| 1 | 6 | 4 | 10 | 7 | 6 | 4 | 8 | 5 |
| 2 | 7 | 4 | 10 | 7 | 6 | 3 | 9 | 7 |
| 3 | 7 | 5 | 11 | 8 | 7 | 4 | 8 | 6 |

-continued

| Test No. | Roses Treated | Roses Control | Carnations Treated | Carnations Control | Mums Treated | Mums Control | Gladioli Treated | Gladioli Control |
|---|---|---|---|---|---|---|---|---|
| 4 | 6 | 4 | 10 | 8 | 8 | 5 | 8 | 5 |
| 5 | 6 | 4 | 10 | 7 | 8 | 5 | 8 | 6 |
| 6 | 7 | 4 | 11 | 8 | 7 | 4 | 9 | 6 |
| 7 | 6 | 5 | 9 | 7 | 6 | 4 | 8 | 5 |
| 8 | 8 | 4 | 9 | 7 | 8 | 4 | 8 | 5 |
| 9 | 7 | 5 | 11 | 8 | 8 | 4 | 8 | 5 |
| 10 | 6 | 5 | 10 | 7 | 7 | 5 | 9 | 6 |
| 11 | 6 | 5 | 10 | 7 | 8 | 4 | 7 | 5 |
| 12 | 7 | 4 | 10 | 7 | 7 | 4 | 9 | 6 |
| 13 | 7 | 5 | 10 | 8 | 8 | 6 | 8 | 5 |
| 14 | 7 | 5 | 9 | 6 | 8 | 5 | 9 | 5 |
| 15 | 6 | 5 | 9 | 7 | 8 | 4 | 8 | 5 |
| 16 | 7 | 4 | 8 | 5 | 7 | 5 | 8 | 6 |
| 17 | 7 | 5 | 10 | 8 | 9 | 4 | 7 | 5 |
| 18 | 6 | 4 | 10 | 8 | 7 | 4 | 8 | 5 |
| 19 | 8 | 5 | 10 | 9 | 7 | 5 | 8 | 5 |
| 20 | 7 | 5 | 10 | 8 | 8 | 5 | 8 | 5 |

All flowers treated by the methods of the invention show marked improvement of shelf life freshness over control flowers.

Six experiments conducted are not included in the tabulated data above. This was a result of the failure of all the flowers in both groups. These general failures were attributable to the age of the flowers when they were purchased. This points out the fact that the effectiveness of the apparatus is dependent on the freshness of the flowers. Flowers that are harvested and keep in cold storage for extended periods of time suffer massive tissue death and do not respond to any form of preservation technique.

c. Current

Tests were conducted to determine the current existing in plant development media and in plant parts (i.e., stems). Maximum current was determined by contacting the leads of a multimeter to one another utilizing three different power sources. Next, a plant development medium was placed in the circuit. Finally, three types of stems (rose, gladiolus, pine tree) were placed in the circuit. Multimeter readings of current through each such circuit were measured and reported in in amps/milliamps as shown in the table below:

| | | | |
|---|---|---|---|
| Lead to Lead | 1 amp | >1 amp | 80 milliamps |
| Water | 52 milliamps | 65 milliamps | 39 milliamps |
| Rose Stem | .75 milliamps | 1.4 milliamps | .19 milliamps |
| Gladiolus Stem | .20 milliamps | .84 milliamps | .07 milliamps |
| Pine Tree | 1.1 milliamps | 2.5 milliamps | .22 milliamps |

Water Quality

Water used for cut flowers should be changed a minimum of every 48 hours, but in practice, few consumers find this to be convenient. As a result of not changing the water, bacteria quickly begin to grow therein. The result of this bacterial growth is the fouling of the water and the clogging of the vascular system of the plant. After several days, the water can become odorous.

It was noted in the tests conducted on all cut flower varieties that the water in the treated cut flowers in vases containing the apparatus 10 of the invention remained "sweet" for the duration of the experiment as compared to control cut flowers. No water changes occurred during the experiments. While the water in all vases showed some discoloration, less was noted in the treated vases containing the apparatus. It is unknown if this reduction in odor-producing bacteria was a result of a reduction of fluids coming from the flower stems that may serve as a nutrient source for the bacteria, a direct effect of the apparatus on the growth rates of bacteria, some chemical reaction that suppresses the production of certain noticeable odors, or other phenomenon.

Example IV

Christmas Trees

Scotch pine, fir, and pine trees 104 were selected for these tests. For each variety, two trees of similar size, shape and general condition were selected. Each tree was pre-treated by removing the lower 2 inches of the trunk of the tree. Each tree was then placed in a supporting stand that also served as a water reservoir for the tree. One of each variety of the trees was fitted with the apparatus 10 of the invention. The negative electrode 14 was placed in the water reservoir and the positive electrode was attached by a brass screw to a position approximate eight inches from the top of the tree and fixedly inserted into the vascular system of the trunk. Current level at the source was measured at 1.5 volts and the pulse rate on all trees was set at 20 hertz. The treated and controlled trees were all placed under the same environmental conditions. The tests were conducted for a period of sixty days. Of interest in these tests were the observable freshness of the trees and the rate of needle drop.

At the end of thirty days, the control trees showed visible signs of dryness in the upper portions of the tree and some needle drop was noted. This needle drop of the control trees thereafter increased on a daily basis for the duration of the experiment. The treated trees exposed to the apparatus of the invention were still fresh at the end of the thirty days and had little needle drop. At the end of the sixty days both the control trees and the treated trees were dry and losing some needles.

At the end of sixty days, all trees were removed from their support containers and placed on an appropriate surface and shaken. The needles were collected from each tree and were measured comparatively by volume (cubic inches).

|         | Scotch Pine | Fir  | Pine |
|---------|-------------|------|------|
| Treated | 3.5         | 5.8  | 5.0  |
| Control | 10.9        | 14.6 | 14.7 |

The degree of freshness as compared by cubic volumes of needles displaced by shaking was 30–40% better in treated than in control trees. The trees treated by the method of the invention also retained their needles much longer than the control trees.

Example V

Bacterial Growth

In order to test the effect of the current invention on the growth of bacteria, the following test will be preformed. Two liquid cultures of nutrient medium will be prepared and both will be inoculated with a bacterial colony. Into one solution, two electrodes 12, 14 of the apparatus will be introduced. The electrodes will be positioned in a manner to provide the maximum current flow through the nutrient medium 76. Both cultures will be maintained under suitable conditions to promote bacterial growth. On a daily basis samples will be removed from both containers and a standard bacteriological count will be conducted to determine if any noticeable differences are present in the growth rates of the two cultures. This test will be repeated with different species of bacteria typically found growing in vase water, with different current amounts and different pulse rates. Additionally, these tests will be conducted on solid agar based media.

It is expected that a reduction in the growth of certain bacteria will be noticed when treated by the methods of the invention. There may also be differences in the way Gram-negative bacteria respond compared to the way Gram-positive bacteria respond to the methods of the invention.

Example VI

Additional Testing of the Methods of the Invention on Plant Development and Freshness Additional test will be conducted to determine the exact response of plants to the effects of the current invention. Some of these tests are discussed below.

a. Seedling Growth

To determine the effects of the current invention at various current levels and pulse rates, a number of tests will be conducted. This will involve planting a number of trays of a given species of seed. An apparatus delivering a different current level and a different pulse rate will be attached to each tray. All trays will be treated to the same environmental conditions. Results will be recorded as growth rates. These tests will be repeated with different species of plants.

It is expected that different species will respond differently to slight differences in current level and pulse rate. This is thought to be a result of the different naturally occurring cellular resistance noted in different species of plants.

b. Open Field, Plot, Bed Tests

Tests will be conducted using multiple probes implanted in the soil at different positions to determine the effective range of the apparatus 10 on the growth of plants. This test will be repeated on different species and at different current and pulse rates.

It is expected that altering the position of electrodes 12, 14 in field application of the current invention will alter its effectiveness on the growth of plants. It is also expected that different current levels and pulse rates will affect different species of plants differently.

c. Cut Flower Vase Life

In order to determine the effectiveness of the current invention on commercially used flowers, tests will be conducted on all major species of commercial cut flowers. These test will be comparative test to determining vase life of the flowers under normal use conditions. Tests will also be conducted using different current levels and pulse rates to determine if differences occur in the vase storage of different varieties of cut flowers.

It is expected that different species of flowers will respond differently to the application of the methods of the present invention. It is also expected that different species will respond to different current levels and pulse rates. This is thought to be a result of the naturally occurring cellular resistance found in plants.

d. Cut Flower Shipping Methods

Tests will be conducted to determine the effectiveness of the current invention on the shipping of fresh cut flowers. The flowers to be tested will be wrapped in a moistened sheet of conductive material. One end of this material will be connected to the positive electrode of the current invention and the other end will be connected to the negative electrode. The test will measure the maintenance of the freshness of flowers under normal shipping conditions and the quality of flowers after shipping.

It is expected that flowers treated by the methods of the invention will be able to tolerate lower shipping temperatures and will remain fresher after shipment than flowers shipped under conventional methods.

CONCLUSION

The present invention has been described in terms of particular embodiments which comprise preferred modes for the practice of the invention. It will be appreciated by those of skill in the art that, in light of the present disclosure, numerous modifications and changes can be made in the particular embodiments exemplified without departing from the intended scope of the invention. For example, one of skill will recognize that the ability to promote the development and maintain the freshness of plant or plant parts will be useful in handling other forms of plant tissue as well. Certain fungi with vascular systems which transport nutrients and fluid throughout the fungus may be amenable to the apparatus, and methods of the invention. In another example, stems containing fruits could be treated with such electrodes in solutions with beneficial results. Unripe fruits could be stored and shipped with electrodes in solutions and then exposed to ethylene gas at a desired time, which gas would then ripen the fruit. All such modifications are intended to be included within the scope of the appended claims.

What is claimed is:

1. A method of promoting the development or maintaining the freshness of a plant or a part thereof, comprising the steps of:

creating a regularly pulsed electrical current in a plant development medium, said medium including a liquid capable of conducting electricity, said current delivered in a range of −0.0001 to 5 volts to said medium;

contacting said plant or part thereof with said medium; and, regularly pulsing the electrical current through the medium by alternating turning the electrical current on and off.

2. The method of claim 1 wherein said medium is substantially all water.

3. The method of claim 2 wherein said water is a part of a solution further comprising a horticultural preservative.

4. The method of claim 1 for maintaining the freshness of a plant part wherein said part further comprises a plant stem.

5. The method of claim 4 wherein said plant stem further comprises a flower.

6. The method of claim 1 wherein said part further comprises an evergreen tree trunk separated from its root portion.

7. A method of promoting the development or maintaining the freshness of a cut stem, comprising the steps of:

creating an electrical field by establishing a current in a plant development medium, said medium further comprising water capable of conducting electricity, said current delivered in a range of −0.0001 to 5 volts to said medium; and contacting said cut stem with said medium; and, generating in said cut stem said electrical field.

8. The method of claim 7 wherein said medium is substantially all water.

9. The method of claim 8 wherein said water is a part of a solution further comprising a bactericide.

10. The method of claim 7 for maintaining the freshness of a plant part wherein said cut stem further comprises a flowering plant stem.

11. The method of claim 10 wherein said flowering plant stem further comprises a flower.

12. A method of promoting the development or maintaining the freshness of a plant or a part thereof comprising creating a regularly pulsed electrical field in a plant or part thereof.

13. The method of claim 12 wherein said part further comprises a plant stem.

14. The method of claim 13 wherein said plant stem further comprises a flower.

15. An apparatus for creating an electrical field in a plant or part thereof comprising:

a first electrode;

a second electrode;

an electrical current generator operably linked to said first and said second electrode;

said generator alternating sending and not sending electrical current regularly through the plant or part thereof; said current delivered in a range of −0.0001 to 5 volts to said medium.

16. The apparatus of claim 15 wherein said generator regularly generates electrical pulses through a conductive plant development medium in electrical contact with said plant or said part thereof.

17. The apparatus of claim 16 wherein the generator is further capable of delivering said regular electrical pulses at a rate of a range of 10 to 30 hertz.

18. A kit for promoting the development or maintaining the freshness of a plant or a part thereof comprising:

an apparatus for creating a regularly pulsed electrical field in said plant or said part thereof or in a plant development medium in electrical connection with said plant or said part thereof;

said electric field established by a current delivered in a range of −0.0001 to 5 volts to said medium;

a source for supplying an electrical current to said apparatus; and a plant development medium or a recipe therefor, said medium capable of conducting electricity.

19. A kit for promoting the development or maintaining the freshness of a plant part comprising:

a apparatus for creating a regularly pulsed electrical field in a plant part;

said electric field established by a current delivered in a range of −0.0001 to 5 volts to said medium; and, a source for supplying an electrical current to said apparatus.

20. An apparatus for disposal in a conductive plant development medium and creating a regularly pulsed electrical field in the conductive plant development medium comprising:

a first electrode;

a second electrode;

an electrical current generator operably linked to said first and second electrode; said current delivered in a range of −0.0001 to 5 volts to said medium; and a power supply operably linked to said generator.

21. The apparatus of claim 20 wherein said first and second electrodes are separable from one another using extension means.

22. A method of promoting the development or maintaining the freshness of a plant or a part thereof, comprising the steps of:

inserting a portion of the plant or plant part into a plant development medium including a liquid capable of conducting electricity;

sending an electrical current through the conductive plant development medium;

regularly pulsing the electrical current by alternately charging and discharging a capacitor in the electrical circuit, said current delivered in a range of −0.0001 to 5 volts to said medium; and, generating a regularly pulsed electrical current in the plant or plant part thereof.

23. A method of maintaining the freshness of a cut stem, comprising the steps of:

creating a regularly pulsed electrical current in a liquid capable of conducting electricity; and, contacting said cut stem with said liquid.

* * * * *